US012690086B2

(12) United States Patent
Wang et al.

(10) Patent No.: US 12,690,086 B2
(45) Date of Patent: Jul. 21, 2026

(54) METHOD, DEVICE AND COMPUTER STORAGE MEDIUM OF COMMUNICATION

(71) Applicant: NEC CORPORATION, Tokyo (JP)

(72) Inventors: Da Wang, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 326 days.

(21) Appl. No.: 18/278,989

(22) PCT Filed: Feb. 26, 2021

(86) PCT No.: PCT/CN2021/078241
§ 371 (c)(1),
(2) Date: Aug. 25, 2023

(87) PCT Pub. No.: WO2022/178859
PCT Pub. Date: Sep. 1, 2022

(65) Prior Publication Data
US 2024/0129989 A1     Apr. 18, 2024

(51) Int. Cl.
*H04W 76/20*          (2018.01)
*H04W 8/24*           (2009.01)

(52) U.S. Cl.
CPC ............. *H04W 76/20* (2018.02); *H04W 8/24* (2013.01)

(58) Field of Classification Search
CPC ........ H04W 8/24; H04W 76/20; H04W 88/06
See application file for complete search history.

(56) References Cited

U.S. PATENT DOCUMENTS

| | | | |
|---|---|---|---|
| 2017/0127217 A1 | 5/2017 | Miao et al. | |
| 2019/0124560 A1* | 4/2019 | Li | H04W 36/00224 |
| 2019/0182000 A1* | 6/2019 | Futaki | H04L 5/0046 |
| 2021/0258951 A1* | 8/2021 | Sakhnini | H04W 56/0015 |
| 2021/0378050 A1* | 12/2021 | Youtz | H04W 76/10 |
| 2024/0098538 A1* | 3/2024 | Koskinen | H04W 24/10 |
| 2024/0430762 A1* | 12/2024 | Hsieh | H04W 36/0088 |

(Continued)

FOREIGN PATENT DOCUMENTS

| | | |
|---|---|---|
| EP | 1 841 251 A1 | 10/2007 |
| WO | 2020/191524 A1 | 10/2020 |
| WO | 2020/221077 A1 | 11/2020 |

OTHER PUBLICATIONS

"Discussion on Scheduling gap for Periodic short-time switching," 3GPP TSG-RAN WG2 #113-e, China Telecom, R2-2101789, Feb. 5, 2021, 3 pages.

(Continued)

*Primary Examiner* — Congvan Tran
(74) *Attorney, Agent, or Firm* — Sughrue Mion, PLLC

(57)        ABSTRACT

Embodiments of the present disclosure relate to methods, devices and computer readable media for communication. A method of communication comprises receiving, at a terminal device and from a network device of a communication network, a configuration comprising a pattern of a gap and a RRC reconfiguration to be applied during the gap for reduction of a capability of the terminal device to communicate with the communication network; and applying the RRC reconfiguration upon a start of the gap. Thereby, the capability of the terminal device can be flexibly coordinated, and thus services at networks of USIMs can be performed in a more flexible and efficient way.

8 Claims, 5 Drawing Sheets

(56)            References Cited

U.S. PATENT DOCUMENTS

2024/0430950 A1 * 12/2024 MolavianJazi ..... H04W 52/367
2025/0024403 A1 *  1/2025 Velev ................... H04W 76/27

OTHER PUBLICATIONS

"Analysis on various scenarios of UE switching," 3GPP TSG-RAN
WG2 Meeting #113-e, China Telecom, R2-2101780, Feb. 5, 2021,
pp. 1-5.
International Search Report for PCT/CN2021/078241 dated Nov.
25, 2021.
Written Opinion for PCT/CN2021/078241 dated Nov. 25, 2021.

* cited by examiner

100A

101

102

110

120

131      132

130

100B

110

111      112

111-1      112-1

111-2      112-2

400

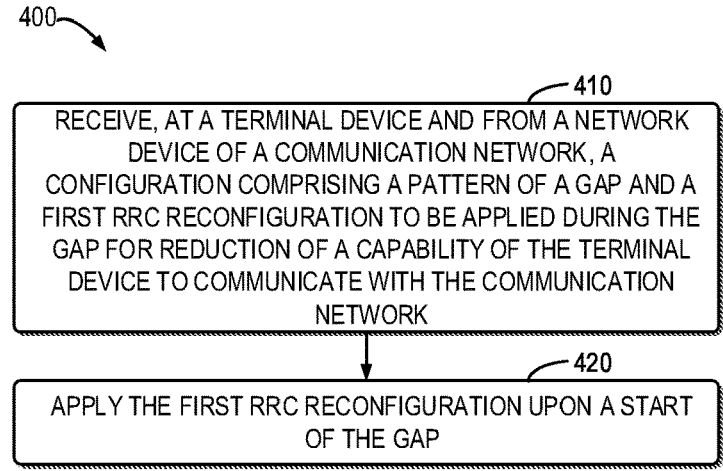

410

RECEIVE, AT A TERMINAL DEVICE AND FROM A NETWORK DEVICE OF A COMMUNICATION NETWORK, A CONFIGURATION COMPRISING A PATTERN OF A GAP AND A FIRST RRC RECONFIGURATION TO BE APPLIED DURING THE GAP FOR REDUCTION OF A CAPABILITY OF THE TERMINAL DEVICE TO COMMUNICATE WITH THE COMMUNICATION NETWORK

420

APPLY THE FIRST RRC RECONFIGURATION UPON A START OF THE GAP

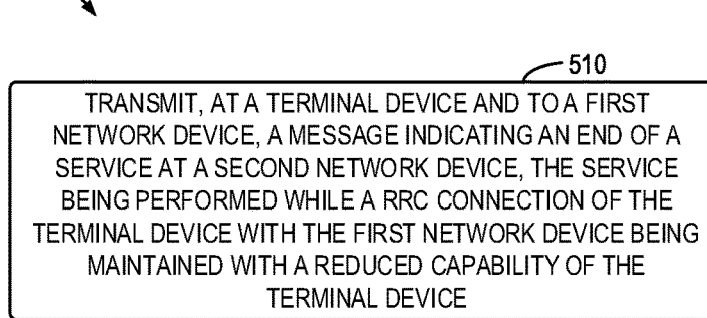

510

TRANSMIT, AT A TERMINAL DEVICE AND TO A FIRST NETWORK DEVICE, A MESSAGE INDICATING AN END OF A SERVICE AT A SECOND NETWORK DEVICE, THE SERVICE BEING PERFORMED WHILE A RRC CONNECTION OF THE TERMINAL DEVICE WITH THE FIRST NETWORK DEVICE BEING MAINTAINED WITH A REDUCED CAPABILITY OF THE TERMINAL DEVICE

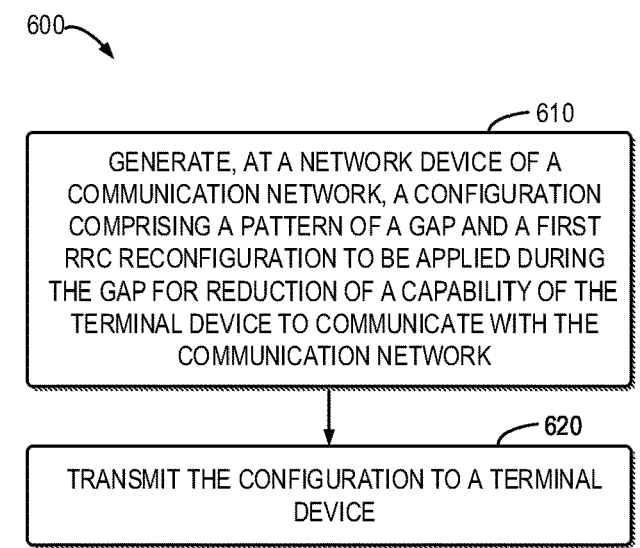

610

GENERATE, AT A NETWORK DEVICE OF A COMMUNICATION NETWORK, A CONFIGURATION COMPRISING A PATTERN OF A GAP AND A FIRST RRC RECONFIGURATION TO BE APPLIED DURING THE GAP FOR REDUCTION OF A CAPABILITY OF THE TERMINAL DEVICE TO COMMUNICATE WITH THE COMMUNICATION NETWORK

620

TRANSMIT THE CONFIGURATION TO A TERMINAL DEVICE

RECEIVE, AT A FIRST NETWORK DEVICE AND FROM A TERMINAL DEVICE, A MESSAGE INDICATING AN END OF A SERVICE AT A SECOND NETWORK DEVICE, THE SERVICE BEING PERFORMED WHILE A RRC CONNECTION OF THE TERMINAL DEVICE WITH THE FIRST NETWORK DEVICE BEING MAINTAINED WITH A REDUCED CAPABILITY OF THE TERMINAL DEVICE

METHOD, DEVICE AND COMPUTER STORAGE MEDIUM OF COMMUNICATION

CROSS REFERENCE TO RELATED APPLICATIONS

This application is a National Stage of International Application No. PCT/CN2021/078241 filed Feb. 26, 2021.

TECHNICAL FIELD

Embodiments of the present disclosure generally relate to the field of telecommunication, and in particular, to methods, devices and computer storage media for communication in networks of multi-universal subscriber identity module (USIM).

BACKGROUND

Currently, a multi-USIM terminal device occupies a large market share. Two USIM may conform to same or different communication standards such as long term evolution (LTE), new radio (NR) or the like, and the capability of the terminal device may be 1 transmit port (Tx)/1 receive port (Rx), 1Tx/2Rx, 2Tx/1Rx or the like. Rx (Dual Rx) allows the multi-USIM terminal device to simultaneously receive traffic from two networks. 1Tx (Single Tx) allows the multi-USIM terminal device to transmit traffic to one network at one time. 2Tx (Dual Tx) allows the multi-USIM terminal device to simultaneously transmit traffic to two networks. The terms Single Rx/Tx and Dual Rx/Tx do not refer to a device type. A single terminal device may, as an example, uses Dual Tx in some cases but Single Tx in other cases.

In some scenarios, a multi-USIM terminal device may establish a connection in a network A of USIM A and stay in an idle or inactive state in a network B of USIM B. Conventionally, when the terminal device needs to operate in the network B, such as perform data transmission or monitor paging occasion, the terminal device just releases the connection with the network A and switches to the network B without noticing the network A. This will bring a bad impact to performance of the network A.

SUMMARY

In general, embodiments of the present disclosure provide methods, devices and computer storage media for communication in networks of multi-USIM.

In a first aspect, there is provided a method of communication. The method comprises: receiving, at a terminal device and from a network device of a communication network, a configuration comprising a pattern of a gap and a radio resource control (RRC) reconfiguration to be applied during the gap for reduction of a capability of the terminal device to communicate with the communication network; and applying the RRC reconfiguration upon a start of the gap.

In a second aspect, there is provided a method of communication. The method comprises: transmitting, at a terminal device and to a first network device, a message indicating an end of a service at a second network device, the service being performed while a RRC connection of the terminal device with the first network device being maintained with a reduced capability of the terminal device, the first network device being associated with a first subscriber identity module of the terminal device and the second network device being associated with a second subscriber identity module of the terminal device.

In a third aspect, there is provided a method of communication. The method comprises: generating, at a network device of a communication network, a configuration comprising a pattern of a gap and a RRC reconfiguration to be applied during the gap for reduction of a capability of the terminal device to communicate with the communication network; and transmitting the configuration to a terminal device.

In a fourth aspect, there is provided a method of communication. The method comprises: receiving, at a first network device and from a terminal device, a message indicating an end of a service at a second network device, the service being performed while a RRC connection of the terminal device with the first network device being maintained with a reduced capability of the terminal device, the first network device being associated with a first subscriber identity module of the terminal device and the second network device being associated with a second subscriber identity module of the terminal device.

In a fifth aspect, there is provided a terminal device. The terminal device comprises a processor and a memory coupled to the processor. The memory stores instructions that when executed by the processor, cause the terminal device to perform the method according to at least one of the first or second aspect of the present disclosure.

In a sixth aspect, there is provided a network device. The network device comprises a processor and a memory coupled to the processor. The memory stores instructions that when executed by the processor, cause the network device to perform the method according to at least one of the third or fourth aspect of the present disclosure.

In a seventh aspect, there is provided a computer readable medium having instructions stored thereon. The instructions, when executed on at least one processor, cause the at least one processor to perform the method according to at least one of the first or second aspect of the present disclosure.

In an eighth aspect, there is provided a computer readable medium having instructions stored thereon. The instructions, when executed on at least one processor, cause the at least one processor to perform the method according to at least one of the third or fourth aspect of the present disclosure.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein:

FIG. 4 illustrates an example method of communication implemented at a terminal device in accordance with some embodiments of the present disclosure;

FIG. 5 illustrates another example method of communication implemented at a terminal device in accordance with some embodiments of the present disclosure;

FIG. 6 illustrates an example method of communication implemented at a network device in accordance with some embodiments of the present disclosure;

Throughout the drawings, the same or similar reference numerals represent the same or similar element.

DETAILED DESCRIPTION

Figures 1A, 1B:
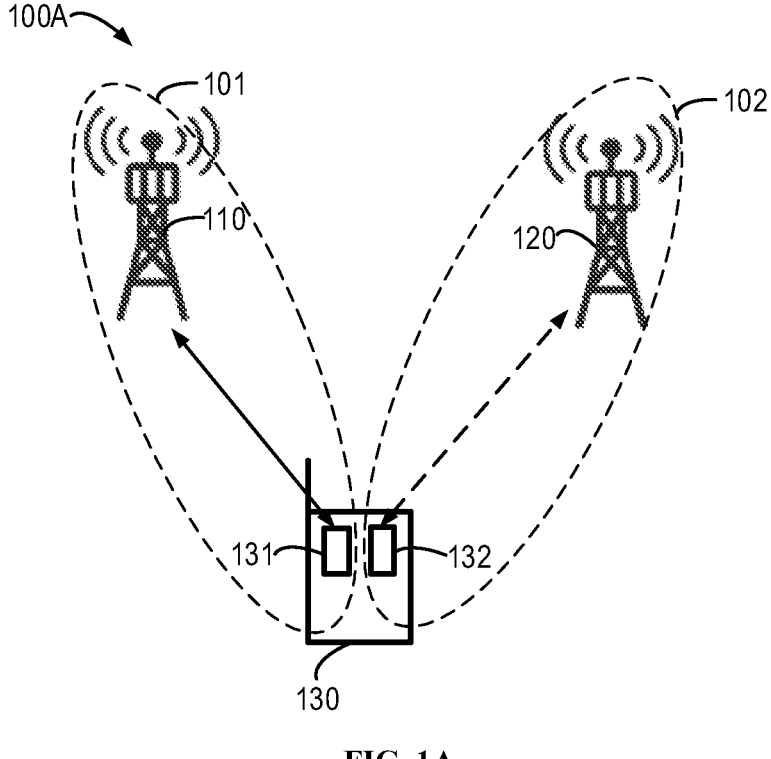
FIG. 1A illustrates an example communication scenario in which some embodiments of the present disclosure can be implemented.
FIG. 1B illustrates a schematic diagram illustrating an example component of a network device in the example communication network.

Principle of the present disclosure will now be described with reference to some embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IoT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. The term "terminal device" can be used interchangeably with a UE, a mobile station, a subscriber station, a mobile terminal, a user terminal or a wireless device. In addition, the term "network device" refers to a device which is capable of providing or hosting a cell or coverage where terminal devices can communicate. Examples of a network device include, but not limited to, a Node B (NodeB or NB), an evolved NodeB (eNodeB or eNB), a next generation NodeB (gNB), a transmission reception point (TRP), a remote radio unit (RRU), a radio head (RH), a remote radio head (RRH), a low power node such as a femto node, a pico node, and the like.

In one embodiment, the terminal device may be connected with a first network device and a second network device. One of the first network device and the second network device may be a master node and the other one may be a secondary node. The first network device and the second network device may use different RATs. In one embodiment, the first network device may be a first RAT device and the second network device may be a second RAT device. In one embodiment, the first RAT device is eNB and the second RAT device is gNB. Information related with different RATs may be transmitted to the terminal device from at least one of the first network device and the second network device. In one embodiment, first information may be transmitted to the terminal device from the first network device and second information may be transmitted to the terminal device from the second network device directly or via the first network device. In one embodiment, information related with configuration for the terminal device configured by the second network device may be transmitted from the second network device via the first network device. Information related with reconfiguration for the terminal device configured by the second network device may be transmitted to the terminal device from the second network device directly or via the first network device.

As used herein, the singular forms 'a', 'an' and 'the' are intended to include the plural forms as well, unless the context clearly indicates otherwise. The term 'includes' and its variants are to be read as open terms that mean 'includes, but is not limited to.' The term 'based on' is to be read as 'at least in part based on.' The term 'one embodiment' and 'an embodiment' are to be read as 'at least one embodiment.' The term 'another embodiment' is to be read as 'at least one other embodiment.' The terms 'first,' and the like may refer to different or same objects. Other definitions, explicit and implicit, may be included below.

In some examples, values, procedures, or apparatus are referred to as 'best,' 'lowest,' 'highest,' 'minimum,' 'maximum,' or the like. It will be appreciated that such descriptions are intended to indicate that a selection among many used functional alternatives can be made, and such selections need not be better, smaller, higher, or otherwise preferable to other selections.

As used herein, the term "subscriber identity module (SIM)" refers to a universal subscriber identity module used in a terminal device. Examples of the SIM include, but not limited to, SIM card, USIM card, ISIM card, or the like. The term "SIM" can be used interchangeably with a USIM or ISIM.

Assuming that a multi-USIM terminal device has established a connection in a network A of USIM A and stays in an idle or inactive state in a network B of USIM B. In this case, if the terminal device needs to handle an incoming service from the network B, the terminal device may perform a switch to the network B. For example, in some scenarios, if the incoming service is a long-time service such as a voice over LTE (VoLTE) or voice over NR (VoNR) voice call or the like, the terminal device may perform a long-time switching. During the long-time switching, the terminal device may release the connection with the network A and switch to the network B. For example, the terminal device may transmit a request for the long-time switching to the network A, and release the connection to switch to the network B in response to receiving a RRCRelease message from the network B. However, this RRC Release based solution will bring a significant interruption to a terminal device with sufficient capability such as 2Rx/2Tx or 2Rx/1Tx in particular.

In some other scenarios, if the incoming service is a short-time service such as a paging reception, measurements, a tracking area update (TAU), a radio access network (RAN)-based notification area update (RNAU), a mobile-originated short message service (MO SMS) or the like, the terminal device may perform a short-time switching. During the short-time switching, the terminal device may maintain the connection with the network A and temporarily switch to the network B. For example, the terminal device may transmit a request for the short-time switching to the network A, and receive a configuration of a scheduling gap from the network A. During the scheduling gap, the terminal device does not perform any uplink (UL) or downlink (DL) transmission and physical downlink control channel (PDCCH) monitoring on serving cells of the network A, except for random access related procedure. Then the terminal device may switch to the network B during the scheduling gap to handle the incoming service, and return to the network A upon or before an end of the scheduling gap. However, this scheduling gap based solution will stop data transmission at cell level and thus may be not flexible or efficient especially for the terminal device with sufficient capability such as 2Rx/2Tx or 2Rx/1Tx.

In view of this, one aspect of embodiments of the present disclosure provides a solution of reducing a capability of the terminal device to communicate with the network A by a down configuration on multi-input and multi-output (MIMO)/multiple transmission, reception point (MTRP), carrier aggregation (CA) or dual connectivity (DC) related features. In this solution, a gap (also referred to as a reduced capability gap or a coordinated gap here) is proposed during which the capability of the terminal device is reduced, in other words, partial of the Rx and/or Tx capabilities is used. In this way, the terminal device has spare Rx and/or Tx capabilities to perform a service at the network B with all or partial of services maintained at the network A, and thus services at the networks A and B can be performed in a more flexible and efficient way.

Another aspect of embodiments of the present disclosure provides a solution of indicating an end of a service at the network B or a return to the network A during a switching of the terminal device from the network A to the network B with a reduced capability, i.e., partial of its transmission and/or reception capabilities is used. In this way, the capability of the terminal device can be flexibly coordinated.

Principles and implementations of the present disclosure will be described in detail below with reference to the figures.

Example of Communication Scenario

FIG. 1A illustrates a schematic diagram of an example communication scenario 100A in which embodiments of the present disclosure can be implemented. As shown in FIG. 1A, the communication scenario 100A may involve a first communication network 101 comprising a first network device 110 and a second communication network 102 comprising a second network device 120. It is to be understood that the first network device 110 is merely an example of network devices in the first communication network 101, and in fact, the first communication network 101 may further comprise more network devices. Similarly, the second network device 120 is merely an example of network devices in the second communication network 102, and in fact, the second communication network 102 may further comprise more network devices.

The communication scenario 100A may also involve a terminal device 130 carrying a first USIM 131 and a second USIM 132. The first USIM 131 communicates with external environment via the first communication network 101, and the second USIM 132 communicates with external environment via the second communication network 102. That is, the first USIM 131 is served by network devices in the first communication network 101, and the first USIM 132 is served by network devices in the second communication network 102.

The first and second USIMs 131 and 132 may conform same or different RATs which are existing now or to be developed in the future. That is, the first and second communication networks 101 and 102 may conform same or different RATs. It should be noted that the number of the USIMs carried by the terminal device 130 is not limited to two, and more than two USIMs also can be applied. Accordingly, it is also to be noted that the communication scenario 100A may involve more communication networks serving the USIMs. For convenience, the following description is given by taking two USIMs and two corresponding communication networks as an example.

It is to be understood that the first network device 110 may also support the second communication network 102, and the second network device 120 may also support the first communication network 101. Thus, the first network device 110 may serve at least one of the first and second USIMs 131 and 132. The second network device 120 may also serve at least one of the first and second USIMs 131 and 132. For convenience, unless otherwise stated, the following description is made under the assumption that the first network device 110 serves the first USIM 131 and the second network device 120 serves the second USIM 132. However, it should be noted that, it is merely an example for illustration, and does not make limitation for the present disclosure. For example, the first and second USIMs 131 and 132 may be served by the same network device such as the first network device 110 or the second network device 120.

The first network device 110 may communicate with the terminal device 130 via a channel such as a wireless communication channel. Similarly, the second network device 120 may also communicate with the terminal device 130 via a channel such as a wireless communication channel. In some embodiments where the first network device 110 supports the first communication network 101 and the second network device 120 supports the second communication network 102, the first USIM 131 may communicate with the first network device 110, and the second USIM 132 may communicate with the second network device 120. In some embodiments where the first network device 110 supports the second communication network 102 and the second network device 120 supports the first communication network 101, the first USIM 131 may communicate with the second network device 120, and the second USIM 132 may communicate with the first network device 110. In some embodiments where the first network device 110 supports both the first and second communication network 101 and 102, both the first USIM 131 and the second USIM 132 may communicate with the first network device 110. In some embodiments where the second network device 120 supports both the first and second communication network 101 and 102, both the first USIM 131 and the second USIM 132 may communicate with the second network device 120.

It is to be understood that the number of devices in FIG. 1A is given for the purpose of illustration without suggesting any limitations to the present disclosure. The communication scenario 100A may include any suitable number of network devices and/or terminal devices adapted for implementing implementations of the present disclosure.

The communications in the communication scenario 100A may conform to any suitable standards including, but not limited to, Global System for Mobile Communications (GSM), Long Term Evolution (LTE), LTE-Evolution, LTE-Advanced (LTE-A), Wideband Code Division Multiple Access (WCDMA), Code Division Multiple Access (CDMA), GSM EDGE Radio Access Network (GERAN), Machine Type Communication (MTC) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

FIG. 1B illustrates a schematic diagram 100B illustrating an example component of a network device in the example communication scenario 100A. For illustration, FIG. 1B will be described in connection with the first network devices 110. It is to be understood that the description on FIG. 1B also apply to other network devices in the communication scenario 100A that shown or not shown. As shown in FIG. 1B, the first network device 110 may comprise a master node (MN) 111 and a secondary node (SN) 112. It is to be understood that the MN 111 and the SN 112 may be implemented as network devices. The MN 111 may have serving cells 111-1 and 111-2, and the SN 112 may have serving cells 112-1 and 112-2. The group of serving cells associated with MN 111 (i.e. master cell group, MCG) may comprise a primary cell (PCell) and at least one secondary cell (SCell), and the group of serving cells associated with the SN 112 (i.e. secondary cell group, SCG) may comprise a primary secondary cell (PSCell) and at least one secondary cell (SCell). It is to be understood that each of the MCG and SCG may have more or less serving cells, and is not limited to that shown.

Return to FIG. 1A, assuming that the terminal device 130 establishes a connection between the first USIM 131 and the first network device 110 using its dual Rx and single/dual Tx capabilities, and stays in an idle state or in an inactive state between the second USIM 132 and the communication network 102 by camping on the second network device 120. In some scenarios, when the terminal device 130 is to perform transmission or reception between the second USIM 132 and the second network device 120, i.e., when the terminal device 130 is to perform a service at the second network device 120, the terminal device 130 may consider switching to the second network device 120. For example, the service may be a VoLTE orVoNR voice call, a paging reception, measurements, a TAU, a RNAU, a MO SMS or the like.

Embodiments of the present disclosure provide improved solutions for the above scenarios. It should be noted that the above scenarios are merely for illustration, and do not make limitation for the present disclosure. Solutions according to embodiments of the present disclosure can apply to any suitable scenarios. For convenience, these solutions will be described in connection with the above scenarios and with reference to FIGS. 2 and 3.

Example Implementation of Capability Coordination

Figure 2:
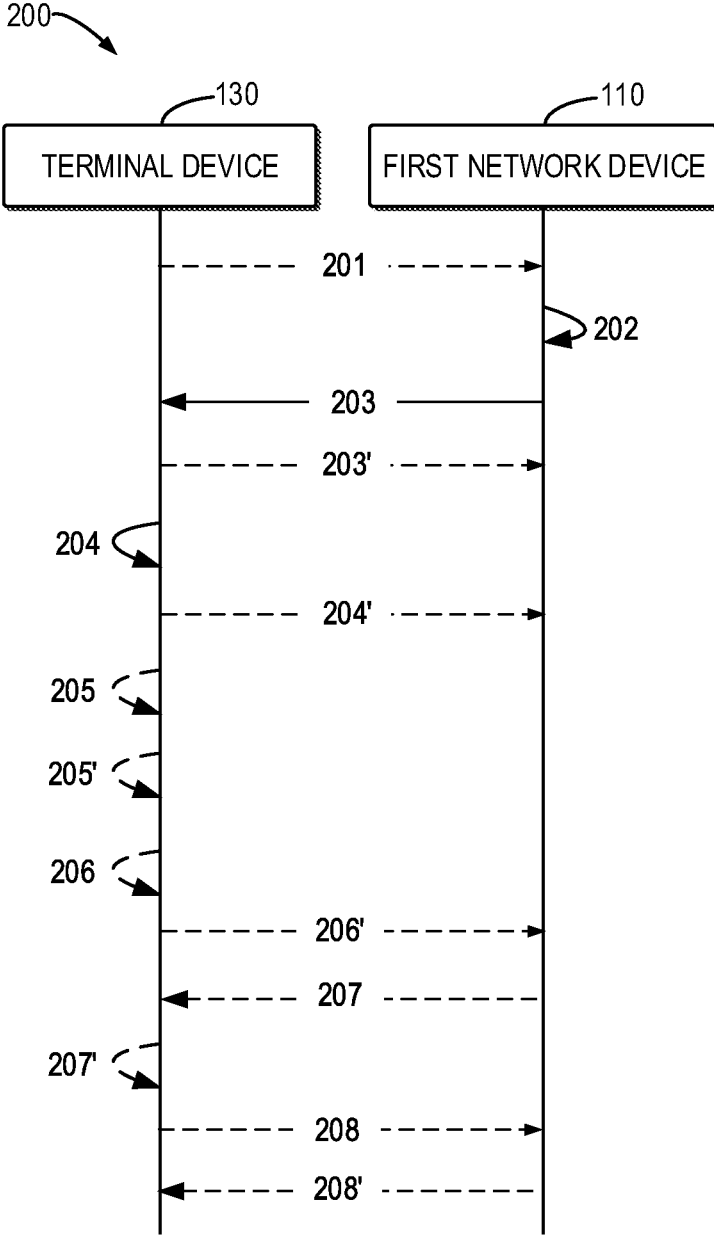
FIG. 2 illustrates a schematic diagram illustrating a process for communication in networks of multi-USIM according to some embodiments of the present disclosure.

FIG. 2 shows a schematic diagram illustrating a process 200 for communication in networks of multi-USIM according to embodiments of the present disclosure. For the purpose of discussion, the process 200 will be described with reference to FIG. 1. The process 200 may involve the terminal device 130 and the first network device 110 as illustrated in FIG. 1. Assuming that the terminal device 130 establishes a connection between the first USIM 131 and the first network device 110 using its dual Rx and single/dual Tx capabilities, and stays in an idle state or in an inactive state between the second USIM 132 and the communication network 102 by camping on the second network device 120. In this case, the terminal device 130 is to perform a service at the second communication network 102 (e.g., the second network device 120).

As shown in FIG. 2, the terminal device 130 may transmit 201 to the first network device 110 a message for requesting the switching or for indicating a service arriving at the second USIM 132 (i.e., a service at the second network device 120). In some embodiments, the message may comprise a pattern (e.g. length, periodicity, time offset, start time and etc) of the service at the second USIM 132. In some embodiments, the message may comprise a type of the service at the second USIM 132. Of course, any other suitable information may also be comprised in the message, and the present disclosure does not make limitation for this.

Upon receipt of the message, the first network device 110 generates 202 a configuration comprising a pattern of a gap and a RRC reconfiguration (also referred to as a first RRC reconfiguration herein) to be applied during the gap. The RRC reconfiguration to be applied during the gap only requires partial of the terminal device 130's reception and/or transmission capabilities, thus the terminal device 130 has spare capabilities to be used for the service at the second network device 120, which can be seen as "switch" partial UE capabilities from first network device 110 to the second network device 120. In this way, a capability of the terminal device 130 to communicate with the first communication network 101 during the gap can be flexibly coordinated.

In some embodiments, the pattern of the gap may comprise at least one of the following: a length of the gap, a periodicity of the gap, a time offset of the gap, or a start time of the gap. It is to be understood that the above information is merely an example, and the pattern of the gap may also comprise any other suitable information. In some embodiments, the gap is one-shot. In some embodiments, the gap may be periodic.

In some embodiments, the RRC reconfiguration may be pre-configured. In some alternative embodiments, the RRC reconfiguration may be dynamically configured.

In some embodiments, the configuration may further comprise another RRC reconfiguration (also referred to as a third RRC reconfiguration herein) to be applied after an end of the gap. In this way, a capability of the terminal device 130 to communicate with the first communication network 101 after the end of the gap can be flexibly coordinated. In some embodiments, the other RRC reconfiguration may be pre-configured. In some alternative embodiments, the other RRC reconfiguration may be dynamically configured.

In some embodiments, the first network device 110 may generate multiple configurations comprising patterns of respective gaps and RRC reconfigurations to be applied during the respective gaps. For example, the gaps may be associated with different services at the second network device 120. Of course, the gaps may also be differently configured in any other suitable ways. In some embodiments, the multiple configurations may have respective identities (IDs).

With reference to FIG. 2, the first network device 110 transmits 203 the configuration to the terminal device 130. In some embodiments where multiple configurations are generated, the first network device 110 may transmit the multiple configurations to the terminal device 130.

Upon receipt of such configuration, the terminal device 130 may transmit 203' a RRCReconfigurationComplete message to the first network device 110. In some embodiments, upon receipt of such configuration, the terminal device 130 may store the configuration. For example, the terminal device 130 may store the configuration in the UE variable. Of course, any other suitable ways are also feasible.

With reference to FIG. 2, the terminal device 130 applies 204 the first RRC reconfiguration upon a start of the gap. In some embodiments, the terminal device 130 may transmit 204' to the first network device 110 an indication indicating the applying of the RRC reconfiguration. For example, the terminal device 130 may transmit the indication via a RRC message such as RRCReconfigurationComplete message or any other suitable messages. As another example, the terminal device 130 may transmit the indication via a media access control control element (MAC CE). Of course, any other suitable ways are also feasible to transmit the indication.

In some embodiments, the terminal device 130 may store 205 a RRC reconfiguration (also referred to as a second RRC reconfiguration herein) applied before the start of the gap. In some embodiments, the terminal device 130 may apply 205' the stored RRC reconfiguration after the end of the gap. Thereby, the terminal device 130 falls back to or in other words, restores the RRC reconfiguration used before the gap after the end of the gap.

In some embodiments where the configuration comprises the third RRC reconfiguration to be applied after the end of the gap, the terminal device 130 may apply 206 the third RRC reconfiguration after the end of the gap. In some embodiments, the terminal device 130 may transmit 206' to the first network device 110 an indication indicating the applying of the third RRC reconfiguration. For example, the terminal device 130 may transmit the indication via a RRC message such as RRCReconfigurationComplete message or any other suitable messages. As another example, the terminal device 130 may transmit the indication via a MAC CE. Of course, any other suitable ways are also feasible to transmit the indication.

In some embodiments, the multiple configurations are configured to the terminal device 130 and the multiple configurations have respective IDs. For convenience, assuming that a first configuration and a second configuration are configured, the first configuration comprises a pattern of a first gap and a RRC reconfiguration (also referred to as a fourth RRC reconfiguration herein) to be applied during the first gap and has a first ID, and a second configuration comprises a pattern of a second gap and a RRC reconfiguration (also referred to as a fifth RRC reconfiguration herein) to be applied during the second gap and has a second ID. In these embodiments, the first network device 110 may transmit 207 a message for reconfiguring the first configuration, the message comprising the first ID of the first configuration and reconfiguration information for the first configuration. In some embodiments, the reconfiguration information may comprise updated information of the pattern of the first gap. In some embodiments, the reconfiguration information may comprise updated information of the fourth RRC reconfiguration. Upon receipt of the message, the terminal device 130 may update 207' the first reconfiguration with the reconfiguration information. It is to be understood that any of the multiple configurations can be similarly reconfigured.

In some alternative or additional embodiments, the terminal device 130 may transmit 208 a request for releasing the first configuration, the request comprising the first ID of the first configuration. Upon receipt of the request, the first network device 110 may transmit 208' a message for releasing the first configuration, the message comprising the first ID of the first configuration. Then the first reconfiguration can be released at the terminal device 130. It is to be understood that any of the multiple configurations can be similarly released.

With the process described in connection with FIG. 2, a capability of a terminal device during the gap and after the end of the gap can be flexibly coordinated, and the service interruption at the first communication network can be minimized.

Another Example Implementation of Capability Coordination

Figure 3:
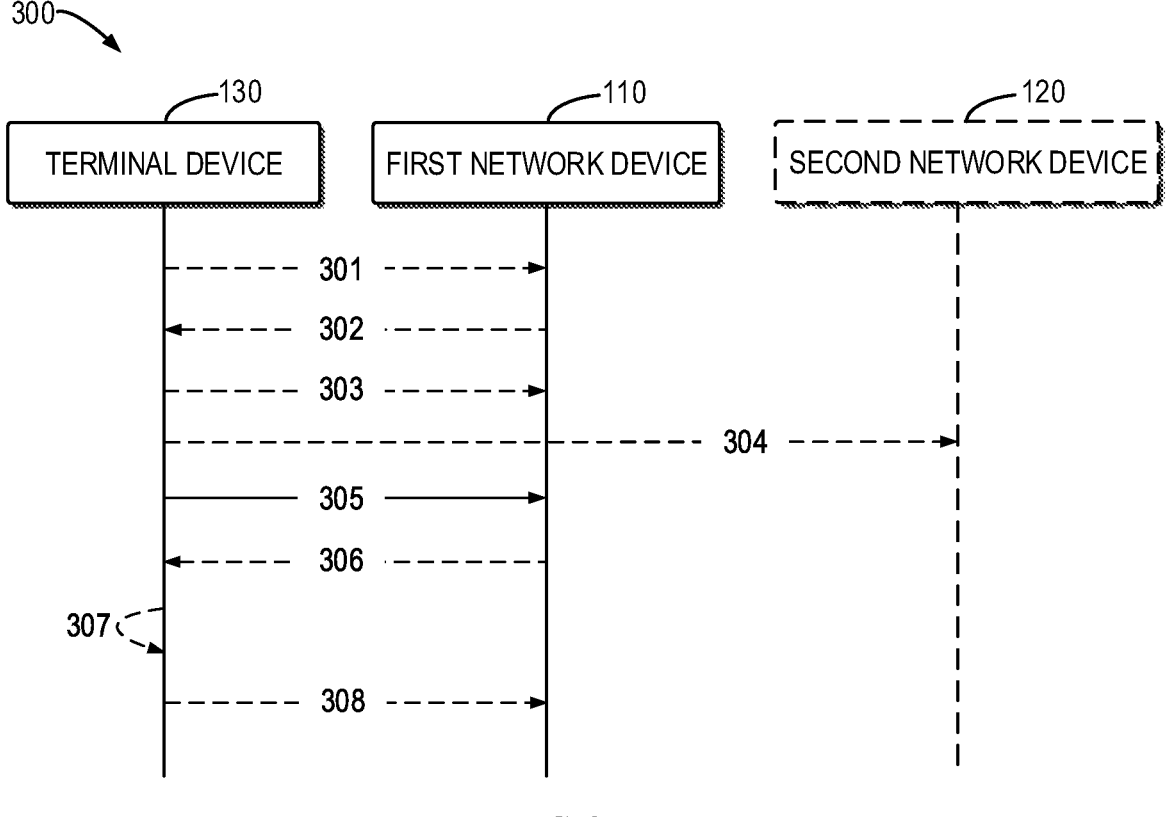
FIG. 3 illustrates a schematic diagram illustrating another process for communication in networks of multi-USIM according to some embodiments of the present disclosure.

FIG. 3 illustrates a schematic diagram illustrating another process 300 for communication during a switch among networks of multi-USIM according to embodiments of the present disclosure. For the purpose of discussion, the process 300 will be described with reference to FIG. 1. The process 300 may involve the terminal device 130, the first network device 110 and the second network device 120 as illustrated in FIG. 1. Assuming that the terminal device 130 establishes a connection between the first USIM 131 and the first network device 110 using its dual Rx and single/dual Tx capabilities, and stays in an idle state or in an inactive state between the second USIM 132 and the communication network 102 by camping on the second network device 120. In this case, the terminal device 130 is to perform a service at the second communication network 102 (e.g., the second network device 120).

As shown in FIG. 3, the terminal device 130 may transmit 301 to the first network device 110 a message for requesting the switching or for indicating a service arriving at the second USIM 132. In some embodiments, the message may comprise a type of the service at the second USIM 132. Of course, any other suitable information may also be comprised in the message, and the present disclosure does not make limitation for this.

Upon receipt of the message, the first network device 110 may transmit 302 a RRCReconfiguration message which requires only partial of TX and/or Rx capabilities to the terminal device 130 to relief a part of transmission and reception capacities. Accordingly, the terminal device 130 may apply the RRC reconfiguration and response 303 to the first network device 110 with a RRCReconfigurationComplete message.

With the reduced capability, the terminal device 130 may switch 304 to the second communication network 102 (in other words, perform the service at the second network device 120) while maintaining the connection with the first communication network 101.

Upon an end of the switching or an end of the service at the second network device 120 or a return to the first communication network 101, the terminal device 130 transmits 305 to the first network device 110 a message indicating the end of the switching or the end of the service or the return. In some embodiments, the terminal device 130 may transmit a signaling radio bearer 1 (SRB1) message to indicate the end of the switching or the end of the service or the return. For example, the terminal device 130 may transmit a UEAssistanceInformation message to indicate the end of the switching or the end of the service or the return. Of course, any other suitable messages are also feasible.

Upon receipt of the message, the first network device 110 may transmit 306 a message for recovery of the capability of the terminal device 130. For example, the first network device 110 may transmit a RRCReconfiguration message to the terminal device 130 to recovery the capability of the terminal device 130. Of course, any other suitable ways are also feasible to recovery the capability of the terminal device 130.

Upon receipt of the message for recovery of the capability of the terminal device 130, the terminal device 130 may update 307 its RRC reconfiguration based on the message.

The terminal device 130 may response 308 to the first network device 110 with a RRCReconfigurationComplete message.

Of course, depending on the implementation by the network side, the first network device 110 may not transmit the message for recovery of the capability of the terminal device 130.

With the process described in connection with FIG. 3, an end of a service at the second network device 120 is indicated to the first network device 110, and thus a coordination for the capability of the terminal device 130 can be efficiently performed.

It should be noted that actions shown in FIGS. 2 and 3 are not always necessary for implementing embodiments of the present disclosure, and more or less actions may be adapted as needed. Corresponding to the processes described in FIGS. 2 and 3, embodiments of the present disclosure provide methods of communication implemented at a terminal device and at a network device. These methods will be described below with reference to FIGS. 4 to 7.

Example Implementation of Methods

FIG. 4 illustrates an example method 400 of communication implemented at a terminal device in accordance with some embodiments of the present disclosure. For example, the method 400 may be performed at the terminal device 130 as shown in FIG. 1. For the purpose of discussion, in the following, the method 400 will be described with reference to FIG. 1. It is to be understood that the method 400 may include additional blocks not shown and/or may omit some blocks as shown, and the scope of the present disclosure is not limited in this regard.

As shown in FIG. 4, at block 410, the terminal device 130 receives, from a network device of a communication network (for example, the first network device 110 of the first communication network 101), a configuration comprising a pattern of a gap and a first RRC reconfiguration to be applied during the gap for reduction of a capability of the terminal device 130 to communicate with the communication network.

In some embodiments, the pattern of the gap may comprise at least one of the following: a length of the gap, a periodicity of the gap, a time offset of the gap, or a start time of the gap. It is to be understood that the pattern of the gap may also comprise any other suitable information. In some embodiments, the first RRC reconfiguration may be pre-configured. In some embodiments, the first RRC reconfiguration may be dynamically configured.

In some embodiments, the terminal device 130 may receive a first configuration comprising a pattern of a first gap and a fourth RRC reconfiguration to be applied during the first gap, and a second configuration comprising a pattern of a second gap and a fifth RRC reconfiguration to be applied during the second gap, the first configuration having a first ID, the second configuration having a second ID. It is to be understood that the terminal device 130 may receive multiple configurations (i.e., multiple pairs of gap and RRC reconfiguration), and the first and second configurations may be any two of the multiple configurations.

At block 420, the terminal device 130 applies the first RRC reconfiguration upon a start of the gap. In some embodiments, the terminal device 130 may transmit to the first network device 110 an indication indicating the applying of the first RRC reconfiguration.

In some embodiments, the terminal device 130 may store a second RRC reconfiguration applied before the start of the gap; and apply the second RRC reconfiguration after an end of the gap.

In some embodiments, the configuration may further comprise a third RRC reconfiguration to be applied after an end of the gap. In these embodiments, the terminal device 130 may apply the third RRC reconfiguration after the end of the gap. In some embodiments, the terminal device 130 may transmit, to the first network device 110, an indication indicating the applying of the third RRC reconfiguration.

In some embodiments where the multiple configurations are configured, the terminal device 130 may receive a message for reconfiguring the first configuration, the message comprising the first ID and reconfiguration information for the first configuration, and update the first configuration with the reconfiguration information. In some embodiments, the terminal device 130 may transmit a request for releasing the first configuration, the request comprising the first ID of the first configuration. It is to be understood that the terminal device 130 may reconfigure or release any of the multiple configurations.

FIG. 5 illustrates another example method 500 of communication implemented at a terminal device in accordance with some embodiments of the present disclosure. For example, the method 500 may be performed at the terminal device 130 as shown in FIG. 1. For the purpose of discussion, in the following, the method 500 will be described with reference to FIG. 1. It is to be understood that the method 500 may include additional blocks not shown and/or may omit some blocks as shown, and the scope of the present disclosure is not limited in this regard.

As shown in FIG. 5, at block 510, the terminal device 130 may transmit, to the first network device 110, a message indicating an end of a service at the second network device 120. In some embodiments, the service is performed while a RRC connection of the terminal device 130 with the first network device 110 being maintained with a reduced capability of the terminal device 130. In some embodiments, the first network device 110 is associated with a first subscriber identity module (for example, the first USIM 131) of the terminal device 130 and the second network device 120 is associated with a second subscriber identity module (for example, the second USIM 132) of the terminal device 130.

In some embodiments, the terminal device 130 may receive, from the first network device 110, a message for recovery of the capability of the terminal device 130, and update a RRC reconfiguration of the terminal device 130 based on the message.

FIG. 6 illustrates an example method 600 of communication implemented at a network device in accordance with some embodiments of the present disclosure. For example, the method 600 may be performed at the first network device 110 as shown in FIG. 1. For the purpose of discussion, in the following, the method 600 will be described with reference to FIG. 1. It is to be understood that the method 600 may include additional blocks not shown and/or may omit some blocks as shown, and the scope of the present disclosure is not limited in this regard.

As shown in FIG. 6, at block 610, the first network device 110 of the first communication network 101 generates a configuration comprising a pattern of a gap and a first RRC reconfiguration to be applied during the gap for reduction of a capability of the terminal device 130 to communicate with the first communication network 101.

It is to be understood that the pattern of the gap may also comprise any other suitable information. In some embodiments, the first RRC reconfiguration may be pre-configured. In some embodiments, the first RRC reconfiguration may be dynamically configured. In some embodiments, the configuration may further comprise a third RRC reconfiguration to be applied after an end of the gap.

At block 620, the first network device 110 transmits the configuration to a terminal device 130. In some embodiments, the first network device 110 may receive, from the terminal device 130, an indication indicating the applying of the first RRC reconfiguration upon a start of the gap.

In some embodiments where the configuration comprises the third RRC reconfiguration to be applied after an end of the gap, the first network device 110 may receive, from the terminal device 130, an indication indicating the applying of the third RRC reconfiguration after the end of the gap.

In some embodiments, the first network device 110 may generate a first configuration comprising a pattern of a first gap and a fourth RRC reconfiguration to be applied during the first gap, and a second configuration comprising a pattern of a second gap and a fifth RRC reconfiguration to be applied during the second gap, the first configuration having a first ID, the second configuration having a second ID. In these embodiments, the first network device 110 may transmit, to the terminal device 130, a message for reconfiguring the first configuration, the message comprising the first ID and reconfiguration information for the first configuration. In some embodiments, the first network device 110 may receive, from the terminal device 130, a request for releasing the first configuration, the request comprising the first ID of the first configuration, and transmit, to the terminal device 130, a message for releasing the first configuration.

Figure 7:
FIG. 7 illustrates another example method of communication implemented at a network device in accordance with some embodiments of the present disclosure.

FIG. 7 illustrates another example method 700 of communication implemented at a network device in accordance with some embodiments of the present disclosure. For example, the method 700 may be performed at the first network device 110 as shown in FIG. 1. For the purpose of discussion, in the following, the method 700 will be described with reference to FIG. 1. It is to be understood that the method 700 may include additional blocks not shown and/or may omit some blocks as shown, and the scope of the present disclosure is not limited in this regard.

As shown in FIG. 7, at block 710, the first network device 110 receives, from the terminal device 130, a message indicating an end of a service at the second network device 120. In some embodiments, the service is performed while a RRC connection of the terminal device 130 with the first network device 110 being maintained with a reduced capability of the terminal device 130. In some embodiments, the first network device 110 is associated with a first subscriber identity module (for example, the first USIM 131) of the terminal device 130 and the second network device 120 is associated with a second subscriber identity module (for example, the second USIM 132) of the terminal device 130.

In some embodiments, the first network device 110 may transmit, to the terminal device 130, a message for recovery of the capability of the terminal device 130. In this way, a RRC reconfiguration of the terminal device 130 can be updated based on the message.

The operations of steps in methods 400-700 are similar with that described in connection with FIGS. 2 and 3, and thus other details are not repeated here.

Example Implementation of Device

Figure 8:
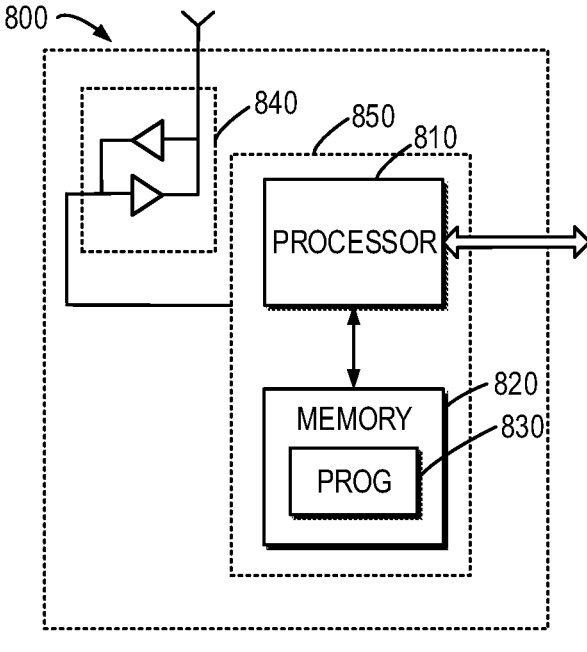
FIG. 8 is a simplified block diagram of a device that is suitable for implementing embodiments of the present disclosure.

FIG. 8 is a simplified block diagram of a device 800 that is suitable for implementing embodiments of the present disclosure. The device 800 can be considered as a further example implementation of the first network device 110, the second network device 120, or the terminal device 130 as shown in FIG. 1. Accordingly, the device 800 can be implemented at or as at least a part of the first network device 110, the second network device 120, or the terminal device 130.

As shown, the device 800 includes a processor 810, a memory 820 coupled to the processor 810, a suitable transmitter (TX) and receiver (RX) 840 coupled to the processor 810, and a communication interface coupled to the TX/RX 840. The memory 810 stores at least a part of a program 830. The TX/RX 840 is for bidirectional communications. The TX/RX 840 has at least one antenna to facilitate communication, though in practice an Access Node mentioned in this application may have several ones. The communication interface may represent any interface that is necessary for communication with other network elements, such as X2/Xn interface for bidirectional communications between eNBs/gNBs, S1/NG interface for communication between a Mobility Management Entity (MME)/Access and Mobility Management Function (AMF)/SGW/UPF and the eNB/gNB, Un interface for communication between the eNB/gNB and a relay node (RN), or Uu interface for communication between the eNB/gNB and a terminal device.

The program 830 is assumed to include program instructions that, when executed by the associated processor 810, enable the device 800 to operate in accordance with the embodiments of the present disclosure, as discussed herein with reference to FIGS. 1 to 7. The embodiments herein may be implemented by computer software executable by the processor 810 of the device 800, or by hardware, or by a combination of software and hardware. The processor 810 may be configured to implement various embodiments of the present disclosure. Furthermore, a combination of the processor 810 and memory 820 may form processing means 850 adapted to implement various embodiments of the present disclosure.

The memory 820 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 820 is shown in the device 800, there may be several physically distinct memory modules in the device 800. The processor 810 may be of any type suitable to the local technical network, and may include one or more of general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

In some embodiments, a terminal device comprises circuitry configured to: receive, from a network device of a communication network, a configuration comprising a pattern of a gap and a first RRC reconfiguration to be applied during the gap for reduction of a capability of the terminal device to communicate with the communication network; and apply the first RRC reconfiguration upon a start of the gap.

In some embodiments, the pattern of the gap may comprise at least one of the following: a length of the gap, a periodicity of the gap, a time offset of the gap, or a start time of the gap.

In some embodiments, the circuitry may be further configured to transmit, to the network device, an indication indicating the applying of the first RRC reconfiguration.

In some embodiments, the circuitry may be further configured to store a second RRC reconfiguration applied before the start of the gap and apply the second RRC reconfiguration after an end of the gap.

In some embodiments, the configuration may further comprise a third RRC reconfiguration to be applied after an end of the gap. In these embodiments, the circuitry may be further configured to apply the third RRC reconfiguration after the end of the gap. In some embodiments, the circuitry may be further configured to transmit to the network device an indication indicating the applying of the third RRC reconfiguration.

In some embodiments, the circuitry may be configured to receive the configuration by receiving a first configuration comprising a pattern of a first gap and a fourth RRC reconfiguration to be applied during the first gap, and a second configuration comprising a pattern of a second gap and a fifth RRC reconfiguration to be applied during the second gap, the first configuration having a first identity, the second configuration having a second identity.

In some embodiments, the circuitry may be further configured to receive, from the network device, a message for reconfiguring the first configuration, the message comprising the first identity and reconfiguration information for the first configuration; and update the first configuration with the reconfiguration information. In some embodiments, the circuitry may be further configured transmit, to the network device, a request for releasing the first configuration, the request comprising the first identity of the first configuration.

In some embodiments, a terminal device comprises circuitry configured to: transmit, to a first network device, a message indicating an end of a service at a second network device, the service being performed while a RRC connection of the terminal device with the first network device being maintained with a reduced capability of the terminal device, the first network device being associated with a first subscriber identity module of the terminal device and the second network device being associated with a second subscriber identity module of the terminal device.

In some embodiments, the circuitry may be further configured to receive, from the first network device, a message for recovery of the capability of the terminal device and update a RRC reconfiguration of the terminal device based on the message.

In some embodiments, a network device comprises circuitry configured to generate, at a network device of a communication network, a configuration comprising a pattern of a gap and a first RRC reconfiguration to be applied during the gap for reduction of a capability of a terminal device to communicate with the communication network and transmit the configuration to the terminal device.

In some embodiments, the pattern of the gap may comprise at least one of the following: a length of the gap, a periodicity of the gap, a time offset of the gap, or a start time of the gap.

In some embodiments, the circuitry may be further configured to receive, from the terminal device, an indication indicating the applying of the first RRC reconfiguration upon a start of the gap.

In some embodiments, the configuration may further comprise a third RRC reconfiguration to be applied after an end of the gap. In these embodiments, the circuitry may be further configured to receive, from the terminal device, an indication indicating the applying of the third RRC reconfiguration after the end of the gap.

In some embodiments, the circuitry may be configured to generate the configuration by generating a first configuration comprising a pattern of a first gap and a fourth RRC reconfiguration to be applied during the first gap and a second configuration comprising a pattern of a second gap and a fifth RRC reconfiguration to be applied during the second gap, the first configuration having a first identity, the second configuration having a second identity.

In some embodiments, the circuitry may be further configured to transmit, to the terminal device, a message for reconfiguring the first configuration, the message comprising the first identity and reconfiguration information for the first configuration. In some embodiments, the circuitry may be further configured to receive, from the terminal device, a request for releasing the first configuration, the request comprising the first identity of the first configuration and transmit, to the terminal device, a message for releasing the first configuration.

In some embodiments, a network device comprises circuitry configured to receive, from a terminal device, a message indicating an end of a service at a second network device, the service being performed while a RRC connection of the terminal device with the network device being maintained with a reduced capability of the terminal device, the network device being associated with a first subscriber identity module of the terminal device and the second network device being associated with a second subscriber identity module of the terminal device.

In some embodiments, the circuitry may be further configured to transmit, to the terminal device, a message for recovery of the capability of the terminal device.

The term "circuitry" used herein may refer to hardware circuits and/or combinations of hardware circuits and software. For example, the circuitry may be a combination of analog and/or digital hardware circuits with software/firmware. As a further example, the circuitry may be any portions of hardware processors with software including digital signal processor(s), software, and memory(ies) that work together to cause an apparatus, such as a terminal device or a network device, to perform various functions. In a still further example, the circuitry may be hardware circuits and or processors, such as a microprocessor or a portion of a microprocessor, that requires software/firmware for operation, but the software may not be present when it is not needed for operation. As used herein, the term circuitry also covers an implementation of merely a hardware circuit or processor(s) or a portion of a hardware circuit or processor(s) and its (or their) accompanying software and/or firmware.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIGS. 2 to 7. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method of communication, comprising:
receiving, at a terminal device and from a network device of a communication network, a configuration comprising a pattern of a gap and a first radio resource control (RRC) reconfiguration to be applied during the gap for reduction of a capability of the terminal device to communicate with the communication network; and
applying the RRC reconfiguration upon a start of the gap, wherein receiving the configuration comprises:
receiving a first configuration comprising a pattern of a first gap and a fourth RRC reconfiguration to be applied during the first gap, and a second configuration comprising a pattern of a second gap and a fifth RRC reconfiguration to be applied during the second gap, the first configuration having a first identity, the second configuration having a second identity.

2. The method of claim 1, wherein the pattern of the gap comprises at least one of the following:
a length of the gap,
a periodicity of the gap,
a time offset of the gap, or
a start time of the gap.

3. The method of claim 1, further comprising:
transmitting, to the network device, an indication indicating the applying of the first RRC reconfiguration.

4. The method of claim 1, further comprising:
storing a second RRC reconfiguration applied before the start of the gap; and
applying the second RRC reconfiguration after an end of the gap.

5. The method of claim 1, wherein the configuration further comprises a third RRC reconfiguration to be applied after an end of the gap, and
the method further comprising:
applying the third RRC reconfiguration after the end of the gap.

6. The method of claim 5, further comprising:
transmitting, to the network device, an indication indicating the applying of the third RRC reconfiguration.

7. The method of claim 1, further comprising:
receiving, from the network device, a message for reconfiguring the first configuration, the message comprising the first identity and reconfiguration information for the first configuration; and
updating the first configuration with the reconfiguration information.

8. The method of claim 1, further comprising:
transmitting, to the network device, a request for releasing the first configuration, the request comprising the first identity of the first configuration.

* * * * *